Jan. 20, 1925.
P. AGARD
PISTON AND RING
Filed July 16, 1923
1,523,572
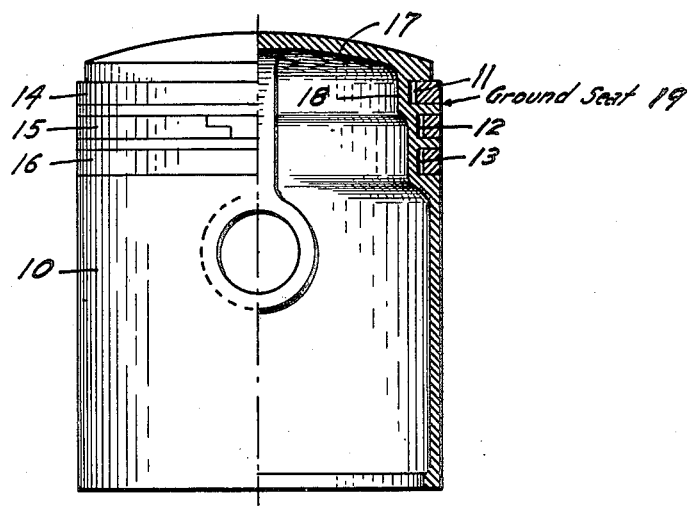
Fig. 1
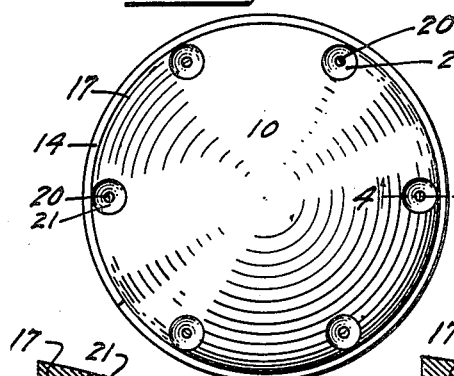
Fig. 2
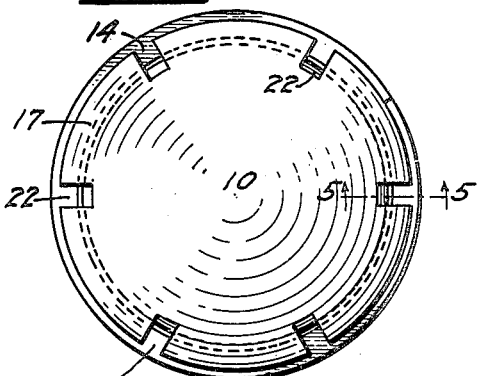
Fig. 3
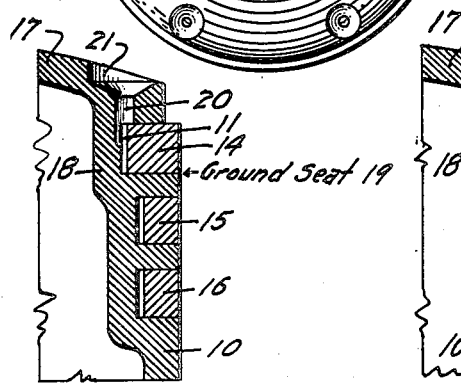
Fig. 4
Fig. 5
INVENTOR.
PALMER AGARD
BY
ATTORNEY.

Patented Jan. 20, 1925.

1,523,572

UNITED STATES PATENT OFFICE.

PALMER AGARD, OF DENVER, COLORADO.

PISTON AND RING.

Application filed July 16, 1923. Serial No. 651,821.

*To all whom it may concern:*

Be it known that I, PALMER AGARD, a citizen of the United States, residing at Denver, in the county of Denver and State of Colorado, have invented certain new and useful Improvements in Pistons and Rings, of which the following is a specification.

This invention relates to pistons and rings therefor, more particularly of the type used in internal combustion engines, and has for its principal object the provision of an efficient combination of piston and piston rings in which the cylinder pressure will act upon the piston ring to cause it to fit more snugly against both the piston and the cylinder wall thereby preventing the escape of the gases past the piston.

Another object resides in the particular construction of the top piston ring and its construction in relation to the other rings and grooves whereby uniform wear on the rings and grooves is obtained and excessive wear is prevented.

A further object is to provide means for collecting oil from the cylinder head and using this oil for ring lubrication.

A still further object is to provide means for collecting and packing a carbon deposit in the rear of the top piston ring to take up the wear in the ring and constantly maintain a gas tight joint.

Other objects and advantages reside in the detail construction of the invention which result in simplicity, economy and efficiency, and which will become more apparent from the following description.

In the following detailed description of the invention reference is had to the accompanying drawing which forms a part hereof. Like numerals refer to like parts in all views of the drawing and throughout the description.

In the drawing:

Fig. 1 is a one-half side elevation and one-half cross section through a piston illustrating the invention in its simplest form.

Fig. 2 is a plan view of a piston illustrating a more complete form of the invention.

Fig. 3 is a plan view of a piston showing an alternate form of the invention.

Fig. 4 is a cross section through the piston and rings taken on the line 4—4, Fig. 2.

Fig. 5 is a fragmentary section of the ring grooves in the piston shown in Fig. 3 and is taken on the line 5—5, Fig. 3.

The applicant is aware that pistons have been made and used in which the diameter of the piston above the top ring groove was less than the main diameter of the piston and has made exhaustive trials with these pistons. He has found, however, that these pistons are unsatisfactory because of the fact that in cutting back the top of the piston the groove bearing surface for the top ring was greatly reduced, being much less than that of the remaining rings and as a result the top groove wore rapidly and the slapping of the top ring up and down became audible resulting in a noisy motor. In an experiment, an ordinary piston with three uniform ring grooves was cut back above the top ring groove and the rings tightly fitted. The noise of the slap of the upper ring was audible outside of the motor after the car had been driven 100 miles.

To eliminate this excessive wear in this type of piston the applicant has devised the piston shown in Fig. 1, in which the numeral 10 designates the piston as a whole; 11, 12, and 13 the upper, middle and lower ring grooves respectively; 14, 15, and 16 the upper, middle and lower rings respectively, and 17 the piston head.

It will be noted that the piston head 17 has been turned down to a diameter slightly less than that of the balance of the piston. Extra metal is left in the casting, as shown at 18, to allow the upper ring groove 11 to be turned deeper than the ring grooves 12 and 13. Ring groove 11 is turned to a depth equal to the depth of the regular groove 12 plus the amount the piston head 17 has been turned back. In other words, the ring 14 will have the same amount of bearing surface at the top that each of the other rings have so that the wear on the upper groove will be no more rapid than the wear on the other grooves. This feature has not been found in any pistons of this type.

The upper ring 14, is made of proportionate greater depth to correspond to the greater depth of its ring groove 11, and its bearing surface at the bottom (designated by the numeral 19) is therefore increased by the amount of set back of the piston head, over the bearing surface of the remaining rings. The bearing surfaces of both the ring 14 and the groove 11 are ground to a perfect seal at 19. Upon the efficiency of the joint at 19, the efficiency of the entire upper ring depends and since the invention has greater bearing surface at this point than at any other similar place in the piston, and in addition has a ground joint at this point, the result has been a very high degree of efficiency. The extra weight of metal in the upper ring also tends to improve the result.

In operation, the force of the cylinder pressure is directed against the ring 14 forcing it downward against its ground seat 19 and sealing the ring against the piston. The gases also travel back along the upper bearing surface of the ring 14 into the space behind the ring and force it against the cylinder wall. The result is a tight and efficient joint between the piston and the cylinder wall.

If desired, to increase the effect of the pressure in back of the ring 14, holes 20 are drilled from the piston head into the space in the rear of the ring 14, as shown in Fig. 4, said holes being countersunk in the head, as shown at 21. This results in a direct pressure against the ring 14 in two directions, one from the top forcing it against the ground seat 19 on the piston and one from the inside forcing the ring against the cylinder wall.

The holes 20 also serve as receptacles for any lubricating oil which may collect above the piston. The oil is forced downward through the holes 20 and into the ring groove by the cylinder pressure, thereby efficiently lubricating the ground joint and reducing leakage and wear to a minimum.

It has been found in practice, that soft carbon will force down in the holes 20 and pack in and fill the space behind the ring. As the ring wears at its contact with the cylinder wall, the space behind increases and is packed with additional carbon thereby effectively sealing the ring against any leakage of gas.

In Figs. 3 and 5, slots 22 are cut in the periphery of the piston head 17 and communicate with the ring groove 11. These slots perform the same functions as the holes 20 but with the additional advantages that they, being cast in the piston, are easier to manufacture, expose more of the surface of the upper ring to the cylinder pressure and do not foul as easily as the holes.

While a specific form of the improvement has been described and illustrated herein, it is desired understood that the same may be varied, within the scope of the appended claim, without departing from the spirit of the invention.

Having thus described the invention, what is claimed and desired secured by Letters Patent is:

In a hollow piston the combination of a piston head of less diameter than the remainder of the piston; a series of piston rings the cross sections of which are rectangles; and a series of ring grooves similar in cross section to said rings one of said ring grooves being placed adjacent the piston head and having a depth greater than the other grooves by the amount of the set back of said piston head, the ring in said latter groove being similarly increased in depth and the wall of said piston being substantially equal in thickness at said ring grooves to that of the remainder of the piston.

In testimony whereof, I affix my signature.

PALMER AGARD.